United States Patent [19]

Hollingsworth

[11] Patent Number: 5,607,054
[45] Date of Patent: Mar. 4, 1997

[54] FOLIO CARRYING CASE FOR A NOTEBOOK COMPUTER

[75] Inventor: W. Dale Hollingsworth, Wilton, Conn.

[73] Assignee: Port, Inc., Norwalk, Conn.

[21] Appl. No.: 404,628

[22] Filed: Mar. 14, 1995

[51] Int. Cl.⁶ ..................................... B65D 85/38
[52] U.S. Cl. .......... 206/320; 206/305; 206/576; 206/45.2; 206/524; 206/762; 206/45.23; 364/708.1
[58] Field of Search ................. 206/320, 305, 206/576, 524, 38, 37, 45.18, 45.2, 45.21, 45.22, 45.23, 45.24; 364/705.01, 705.06, 708.1; 361/683

[56] References Cited

U.S. PATENT DOCUMENTS

| | | | |
|---|---|---|---|
| 1,416,465 | 5/1922 | Harvey | 206/45.21 |
| 3,081,807 | 3/1963 | Lightburn | 206/320 |
| 4,213,520 | 7/1980 | Sarna et al. | 206/45.23 X |
| 4,259,568 | 3/1981 | Dynesen | 206/45.18 X |
| 4,651,872 | 3/1987 | Joyce | 206/45.2 X |
| 4,658,298 | 4/1987 | Takeda et al. | 206/320 X |
| 4,703,161 | 10/1987 | McLean | |
| 4,762,227 | 8/1988 | Patterson | |
| 5,031,763 | 7/1991 | Lynam | 206/88 X |
| 5,105,338 | 4/1992 | Held | 364/705.06 X |
| 5,128,829 | 7/1992 | Loew | 361/683 |
| 5,251,102 | 10/1993 | Kimble | 361/683 |
| 5,341,929 | 8/1994 | Stefancin, Jr. | 206/320 |
| 5,348,347 | 9/1994 | Shink | 206/576 X |
| 5,445,266 | 8/1995 | Prete et al. | 206/320 |

*Primary Examiner*—Paul T. Sewell
*Assistant Examiner*—T. L. Laster

[57] ABSTRACT

A carrying case for a notebook computer includes front and back panels configured to cover opposite sides of the notebook computer, a top panel flexibly connecting top edges of the front and back panels, a bottom panel flexibly connected to a bottom edge of the back panel, a closure flap flexibly connected to a bottom edge of the bottom panel and overlapping a bottom edge of the front cover when the carrying case is in a closed position folded around the notebook computer, and a pair of tabs depending from opposed lateral edges of the front panel toward the back panel when the carrying case is in a closed position. In the closed position, the carrying case serves as a folio to protectively cover the notebook computer and, in an open position, can also serve as a computer stand supporting the notebook computer in an ergonomic position.

16 Claims, 3 Drawing Sheets

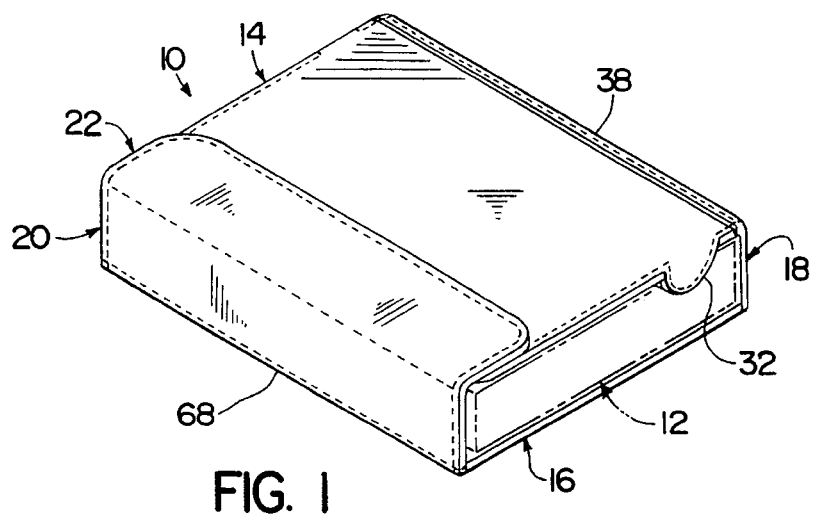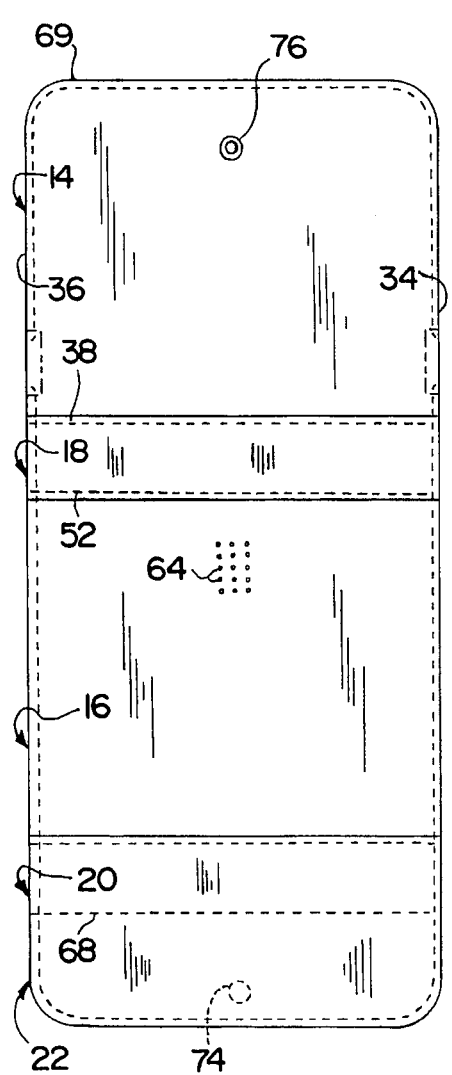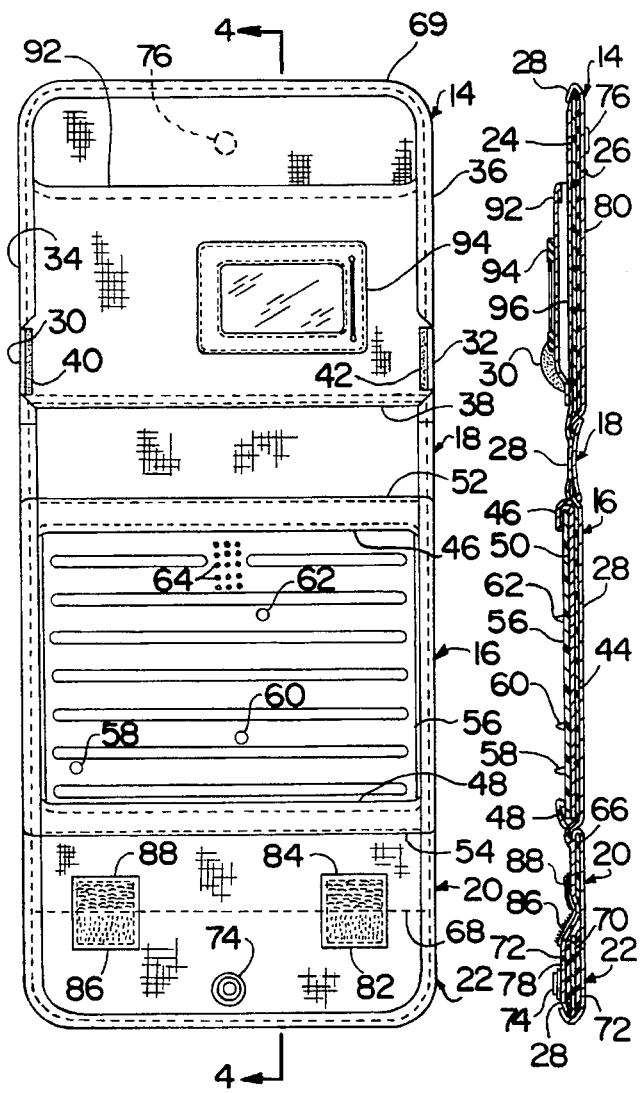

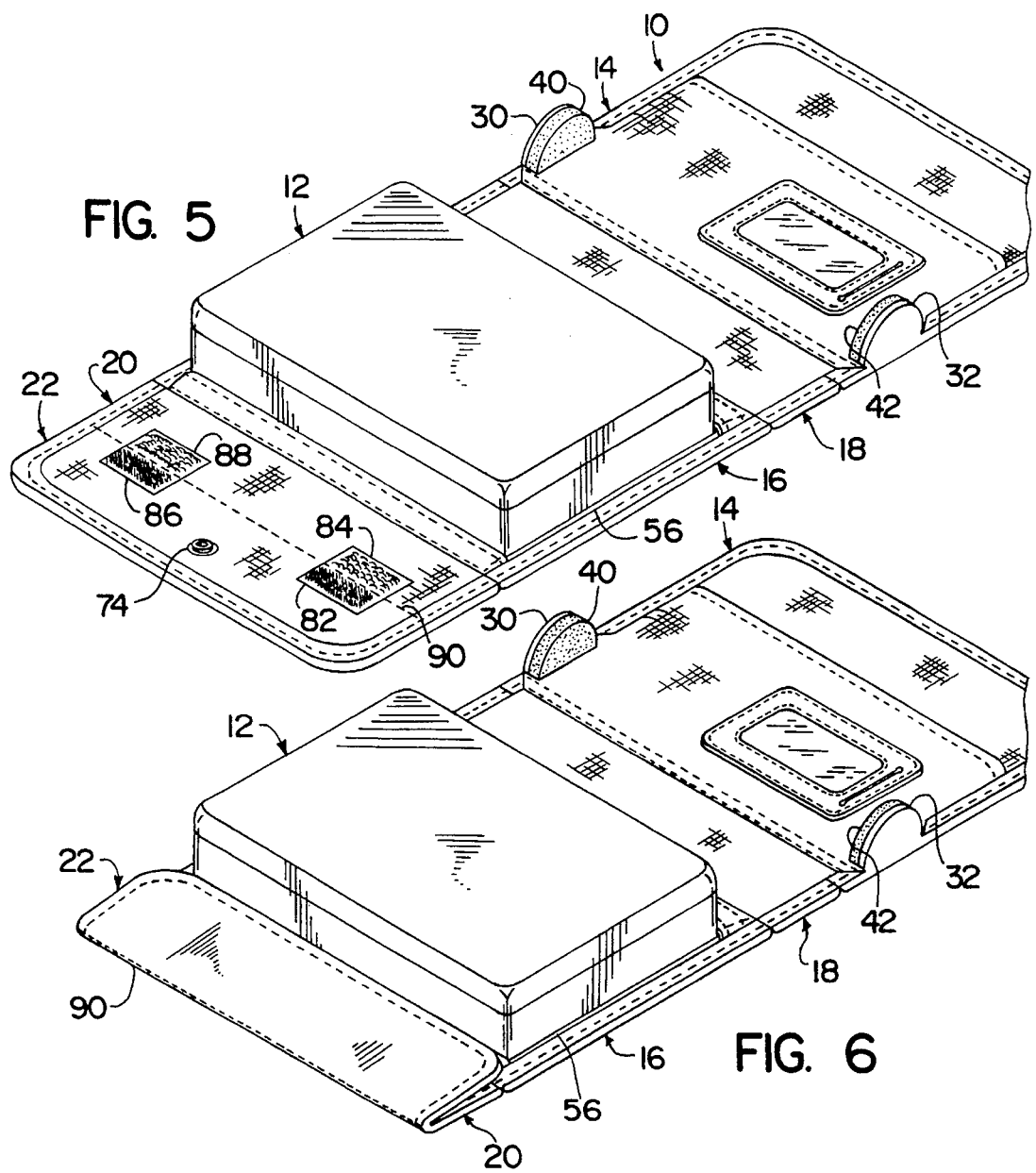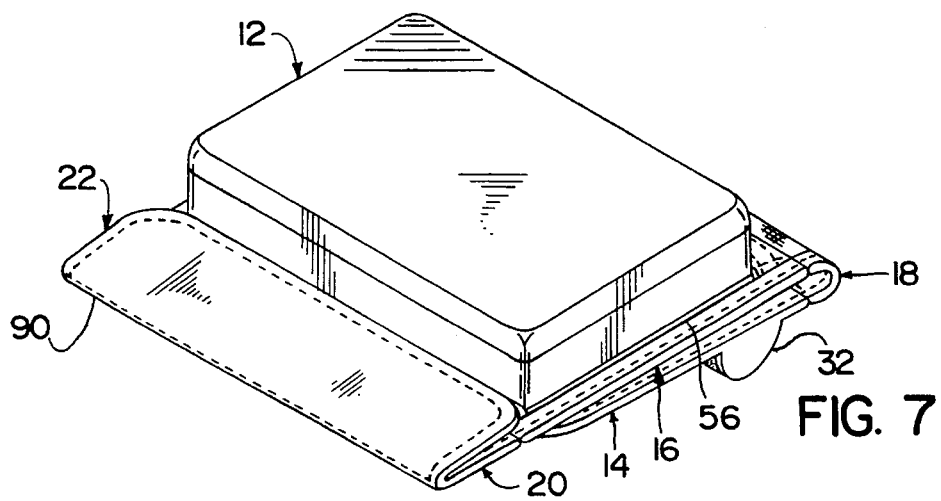

FOLIO CARRYING CASE FOR A NOTEBOOK COMPUTER

BACKGROUND OF THE INVENTION

1. Field of the Invention

The present invention relates generally to a carrying case for a notebook computer and, more particularly, to a carrying case that, in one position, serves as a protective cover or folio for safely transporting a notebook computer and, in another position, serves as a computer stand for supporting the notebook computer in an ergonomic position.

2. Discussion of the Prior Art

"Notebook" computers, that is, personal computers so reduced in size and weight as to be conveniently carried and employed while traveling, have enjoyed widespread acceptance of late and are now regularly used in a variety of settings. Because they are portable, notebook computers are more likely to experience damaging shocks and impact due to rough handling. Hence, there is a need to cover notebook computers in order to protect against damaging impacts and the like. Heretofore, notebook computers have been carried between locations in closed cases with padded walls resembling a briefcase or attache. The notebook computers must typically be removed from such cases when a user desires to operate the computer.

While prior art computer cases are widely employed, they suffer from many disadvantages when used to transport notebook computers. One disadvantage of prior art computer cases is that the computers need to be removed from the cases in order to be operated and that the cases must be stowed separately from the computers such that, if there is limited room for storing a case, the computer work space will become crowded and appear unorganized. In some settings, such as a court room, it is critical that the computer carrying case provide a neat and professional appearance.

SUMMARY OF THE INVENTION

Accordingly, it is a primary object of the present invention to improve carrying cases of the type used for transporting notebook computers.

Another object of the present invention is to protectively cover a notebook computer with a carrying case that provides a neat and professional appearance at all times.

The present invention has yet another object in utilizing a carrying case for a notebook computer as a stand to support the notebook computer in an ergonomic position.

The present invention is generally characterized in a carrying case for a notebook computer including front and back panels configured to cover opposite sides of the notebook computer, a top panel flexibly connecting top edges of the front and back panels, a bottom panel flexibly connected to a bottom edge of the back panel, a closure flap flexibly connected to a bottom edge of the bottom panel and overlapping a bottom edge of the front panel when the carrying case is folded into a closed position surrounding the notebook computer, closure means for detachably connecting the closure flap with the front panel when the carrying case is in the closed position, and a pair of tabs depending from opposed lateral edges of the front panel toward the back panel when the case is in the closed position.

Some of the advantages of the present invention are that the carrying case can be made smaller in size and less bulky than prior art cases, that a notebook computer carried within the case can be used without the need of having to stow the case separately from the computer, and that the case can be used as a portable work surface upon which the computer can be operated in an ergonomic manner.

Other objects and advantages of the present invention will become apparent from the following description of the preferred embodiments taken in conjunction with the accompanying drawings wherein like parts in each of the several figures are identified by the same reference numerals.

BRIEF DESCRIPTION OF THE DRAWINGS

FIG. 1 is a perspective view of a carrying case according to the present invention in a closed position.

FIG. 2 is a rear view of the carrying case of FIG. 1 in an unfolded position.

FIG. 3 is a front view of the carrying case of FIG. 1 in an unfolded position.

FIG. 4 is a cross-sectional view of the carrying case of FIG. 3 taken through line 4—4.

FIGS. 5–7 are perspective views illustrating use of the carrying case of the present invention.

DESCRIPTION OF THE PREFERRED EMBODIMENTS

Figure 8:
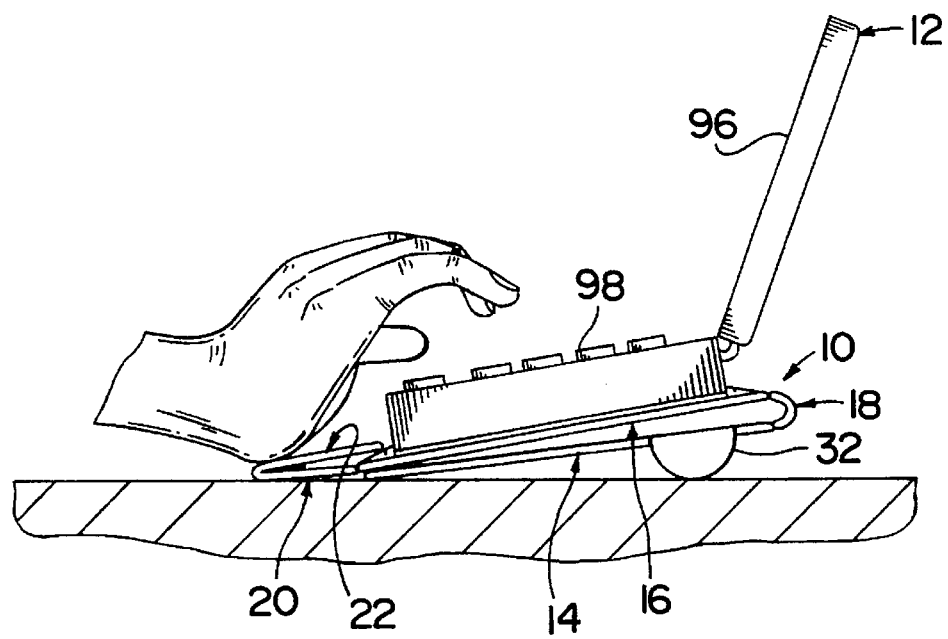
FIG. 8 is a side view further illustrating use of the carrying case of the present invention.

The carrying case of the present invention can be used as a protective cover for any personal computer so reduced in size and weight as to be conveniently carried and employed while traveling; and, accordingly, while the carrying case of the present invention is described herein for use in covering a notebook computer, it will be appreciated that other similarly sized computers and equipment can be protectively covered including, for example, portable laptop computers, notebook computers, subnotebook computers and personal digital assistants.

In FIG. 1, a computer carrying case 10 according to the present invention is shown in a closed position protectively covering a notebook computer 12. For purposes of clarity, features of the carrying case 10 are hereinafter described with reference to the particular orientation of the carrying case as shown in FIG. 1. It will be appreciated, however, that the carrying case and any computer held therein can be oriented in various other ways depending on intended use and preference of the user.

Referring now to FIGS. 1–4, the computer carrying case 10 includes front and back panels 14 and 16, top and bottom panels 18 and 20, and a closure flap 22. Front and back panels 14 and 16 are of substantially rectangular configuration to cover and protect opposite sides of notebook computer 12. As best seen in FIG. 4, front panel 14 includes a generally planar stiffening member 24 and padding 26 encased by a covering 28. Stiffening member 24 includes a pair of tabs 30 and 32 that project from opposite lateral edges 34 and 36 of the front panel toward back panel 16 when front and back panels are held in opposed relation on opposite sides of the notebook computer. Tabs 30 and 32 can have any configuration to laterally restrain a notebook computer held between front and back panels but are preferably semicircular in shape and located near an upper edge 38 of front panel 14 for reasons that will be explained below. Referring now to FIG. 3, foam rubber inserts 40 and 42 are shaped like tabs 30 and 32 and are adhesively bonded or otherwise affixed to opposed inside surfaces of the tabs to provide a relatively soft bearing surface against which the notebook computer can rest when being carried within the carrying case.

Referring again to FIG. 4, back panel 16 includes a planar stiffening member 44 encased by covering 28 and a pair of pockets 46 and 48 formed on an inner surface 50 of the covering along upper and lower edges 52 and 54 of the back panel. Pockets 46 and 48 open toward one another to receive opposite ends of a relatively flexible or semi-rigid mounting plate 56 having a configuration to serve as a base for mounting the notebook computer. For example, mounting plate 56 can include mounting projections, such as posts 58, 60, 62 shown in FIG. 3, which are configured to be received within recesses formed in the bottom surface a particular notebook computer, such as an IBM ThinkPad computer. Ventilation holes 64 can be formed through mounting plate 56, covering 28 and stiffening member 44 and arranged as desired to vent excess heat from the notebook computer and/or to serve as a speaker grill for notebook computers with speakers and sound capability.

Upper edges 38 and 52 of front and back panels 14 and 16 are connected by top panel 18 which is formed by an unstiffened section of covering 28 extending between the upper edges. Top panel 18 has a length from edge 38 to edge 52 approximately equal to the thickness of the notebook computer so that front and back panels 14 and 16 can lay flat against opposite sides of the notebook computer without being bent. Also, because the top panel is unstiffened, it can serve as a hinge permitting pivotal movement of the front and back panels relative to one another so that they can, for example, be folded around the notebook computer like a folio.

Bottom panel 20 is similar in size to top panel 18 but depends from lower edge 54 of back panel 16 and includes a planar stiffening member 66 encased within covering 28. Closure flap 22 depends from a front edge 68 of bottom panel 20 and has a length to overlap the bottom edge 69 of front panel 14 when the carrying case is in the closed position folded around the notebook computer like a folio, as shown in FIG. 1. The closure flap 22 includes a planar stiffening member 70 and padding 72 encased by covering 28. Mating portions 74 and 76 of a clasp or other fastening device are mounted on an inner surface 78 of closure flap 22 and an outer surface 80 of front panel 14, respectively, to mate together when the carrying case is in the closed position.

Sections of the covering 28 between planar stiffening members are preferably stitched, sewn or bonded together to prevent migration of the stiffeners while functioning as fabric hinges between the panels. Mating strips 82, 84, 86 and 88 of hook and loop material are placed on opposite sides of fabric hinge 90 formed between closure flap 22 and bottom panel 20 to hold the flap in a folded position against the bottom panel as will be described in further detail below.

A pocket 92 with a windowed card holder 94 can optionally be formed on an inner surface 96 of front panel 14 for storing papers and other items.

Use of the computer carrying case 10 for protectively covering a notebook computer 12 involves unfolding the carrying case to a flattened position, shown in FIG. 5, where closure flap 22 is separated from front panel 14 and the front panel is pivoted away from back panel 16 to expose mounting plate 56. With mounting plate 56 facing upward, looking at FIG. 5, notebook computer 12 is lowered onto the mounting plate and set down. If the mounting plate includes custom mounting structures, such as posts 58, 60 and 62, the notebook computer is properly oriented to align the posts with recesses formed in the bottom of the computer such that when the computer is lowered onto the mounting plate the custom mounting structure of the mounting plate will mate with the recesses in the bottom of the computer to prevent the computer from sliding off the carrying case. With the notebook computer seated on mounting plate 56, front panel 14 is grasped and pivotally moved over the notebook computer towards back panel 16 until top panel 18 abuts the back of the notebook computer and front panel 14 lays flat across the top of the computer, which in the case of a notebook computer is usually the screen. Tabs 30 and 32 of the front panel are thus positioned along opposite lateral sides of the notebook computer with foam rubber inserts 40 and 42 facing the computer. To finish covering the notebook computer, closure flap 22 is lifted and pivoted over the top of a computer until it overlaps the bottom edge of front panel 14. Closure flap 22 is then pressed down against front panel 14 until mating portion 74 and 76 of the clasp engage one another to lock the carrying case in the closed position shown in FIG. 1.

In the closed position, carrying case 10 protectively covers principal surfaces of the notebook computer so that the computer can be transported with greater confidence. Like a folio, computer carrying case 10 can be held directly in hand or placed within another container to be carried. The padded panels of the carrying case protect the notebook computer from direct impact such as would normally occur in daily handling and transport of the notebook computer while tabs 30 and 32 prevent the notebook computer from sliding out from between the carrying case panels regardless of orientation.

Computer carrying case 10 can be converted from a protective cover to a computer stand by resting back panel 16 of the carrying case on a working surface, such as a desk, and lifting closure flap 22 away from front panel 14 to unlatch the mated clasp portions. Front panel 14 is then pivoted away from the top surface of the notebook computer such that the carrying case is now unfolded as shown in FIG. 5. Closure flap 22 is then pivoted about fabric hinge 90 toward bottom panel 20 until strips 82, 84, 86 and 88 mate with one another to hold the closure flap in a folded position against the bottom panel as shown in FIG. 6. As mentioned previously, closure flap 22 is padded so that, when folded against bottom panel 20, the closure flap can function as a palm rest.

The notebook computer can be tilted into an ergonomic position by folding front panel 14 under back panel 16 as shown in FIG. 7 so that tabs 30 and 32 project downward from the front panel toward the working surface to serve as legs or feet elevating the top end of the carrying case and, thus, the notebook computer 12. The posts projecting from mounting plate 56 serve to stabilize the notebook computer when held within recesses formed in the bottom surface of the computer and prevent the computer from sliding off back panel 16 when the computer is tilted.

When used as a computer stand, carrying case 10 elevates the end of the notebook computer carrying the screen 96 so that when the screen is pivoted away from keyboard 98, as shown in FIG. 8, the user can more easily view the screen. In the open position, carrying case 10 also provides an ergonomic palm rest, formed by closure flap 22, upon which the user may rest his palms when operating a pointing device on the computer or typing.

Figure 9:
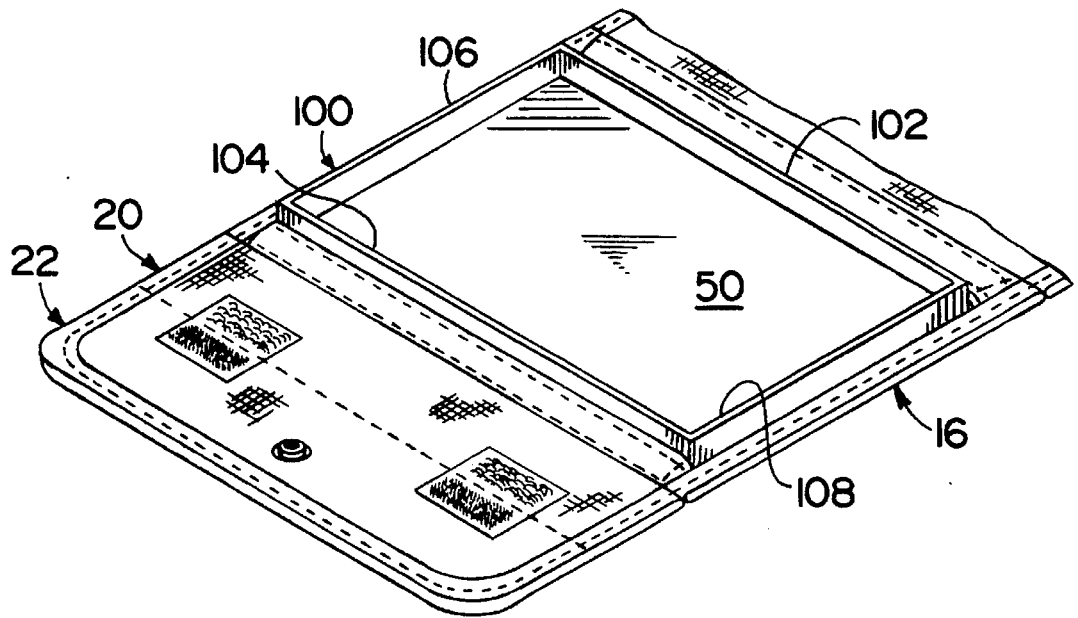
FIG. 9 is a fragmentary perspective view of a modification of the carrying case of the present invention.

Various mounting plates having projecting portions and/ or recesses configured to mate with cooperating features of a particular notebook computer can be substituted for the mounting plate shown in FIGS. 3 and 4. Alternatively, back panel 16 can be modified as shown in FIG. 9 by addition of a retaining wall 100. Retaining wall 100 can be formed directly on inner surface 50 of back panel 16 as shown or on a removable plate similar in structure to mounting plate 56. The retaining wall 100 includes top and bottom walls 102 and 104 extending along top and bottom edges of the back panel, respectively, and lateral side walls 106 and 108 spaced to accommodate notebook computer and having a height to form a lateral abutment surface preventing the computer from sliding off the case when tilted.

From the above, it will be appreciated that the carrying case of the present invention can be used in a first position as a folio to protectively cover and safely transport a notebook computer and, in a second position, as a computer stand to support the notebook computer in an ergonomic position.

The various pockets and panels of the carrying case 10 are preferably of laminated construction with stiffening members and padding covered by a durable natural or synthetic covering, such as leather, nylon or canvas. The components of the carrying case 10 can be assembled by sewing, by adhesives, by both, or by other known techniques.

The closure flap can be held in the closed position overlapping the front panel using a snap closure as shown, cooperating strips of hook and loop material or any other suitable fastening device. Similarly, snaps or other fastening devices can be substituted for the strips of hook and loop material mounted on inner surfaces of the closure flap and bottom panel to hold the closure flap against the bottom panel when the carrying case is in the open position.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A carrying case for a notebook computer comprising front and back panels configured to cover opposite sides of the notebook computer;

a top panel flexibly connecting top edges of said front and back panels;

a bottom panel flexibly connected to a bottom edge of said back panel;

a closure flap flexibly connected to a bottom edge of said bottom panel, said closure flap overlapping a bottom edge of said front panel when said carrying case is in a closed position folded around the notebook computer; and a pair of rigid tabs depending from opposed lateral edges of said front panel toward said back panel when said carrying case is in the closed position;

wherein said front panel can be rotated underneath said back panel such that said tabs extend away from said back panel to form legs for tilting the notebook computer.

2. A carrying case for a notebook computer as recited in claim 1 and further comprising closure means for detachably connecting said closure flap with said front panel when said case is in the closed position.

3. A carrying case for a notebook computer as recited in claim 1 wherein said back panel is configured to mate with the notebook computer.

4. A carrying case for a notebook computer as recited in claim 3 wherein said back panel carries a post that engages characteristic features of the notebook computer.

5. A carrying case for a notebook computer as recited in claim 3 wherein said back panel carries a plurality of posts that engage characteristic features of the notebook computer.

6. A carrying case for a notebook computer as recited in claim 3 wherein said back panel includes a retaining wall along peripheral edges of said back panel to prevent the notebook computer from sliding when the case is tilted.

7. A carrying case for a notebook computer as recited in claim 3 and further comprising a mounting plate removably mounted on said back panel.

8. A carrying case for a notebook computer as recited in claim 3 wherein ventilation holes are formed in said back panel.

9. A carrying case for a notebook computer as recited in claim 1 wherein front and back panels include stiffening members.

10. The carrying case for a notebook computer as recited in claim 9 wherein at least one of the said front and back panels includes padding.

11. A carrying case for a notebook computer as recited in claim 10 wherein said closure flap includes a stiffening member and padding.

12. A carrying case for a notebook computer as recited in claim 1 wherein said tabs are located near an upper edge of said front panel.

13. A carrying case for a notebook computer as recited in claim 12 wherein said tabs are semicircular.

14. A carrying case for a notebook computer comprising front and back panels configured to cover opposite sides of the notebook computer;

a top panel flexibly connecting top edges of said front and back panels;

a bottom panel flexibly connected to a bottom edge of said back panel;

a closure flap flexibly connected to a bottom edge of said bottom panel, said closure flap overlapping a bottom edge of said front panel when said carrying case is in a closed position folded around the notebook computer; and a pair of tabs depending from opposed lateral edges of said from panel toward said back panel when said carrying case is in the closed position, wherein said front panel can be rotated underneath said back panel such that said tabs extend away from said back panel to form legs for tilting the notebook computer; and closure means for detachably connecting said closure flap with said front panel when said case is in the closed position;

wherein, in an open position, said closure flap can be folded against said bottom panel to form a palm rest, and further comprising means for fastening said closure flap to said bottom panel when said closure flap and said bottom panel are folded against one another.

15. A carrying case for a notebook computer as recited in claim 14 wherein said fastening means includes strips of hook and loop material affixed to inner surfaces of said closure flap and said bottom panel.

16. A carrying case for a notebook computer comprising front and back panels configured to cover opposite sides of the notebook computer, wherein said back panel is configured to mate with the notebook computer;

a top panel flexibly connecting top edges of said front and back panels;

a bottom panel flexibly connected to a bottom edge of said back panel;

a closure flap flexibly connected to a bottom edge of said bottom panel, said closure flap overlapping a bottom edge of said front panel when said carrying case is in a closed position folded around the notebook computer;

a pair of tabs depending from opposed lateral edges of said front panel toward said back panel when said carrying case is in the closed position; and a mounting plate removably mounted on said back panel;

wherein said front panel can be rotated underneath said back panel such that said tabs extend away from said back panel to form legs for tilting the notebook computer; and wherein said back panel includes opposed pockets configured to receive opposite edges of said mounting plate.

\* \* \* \* \*